Nov. 9, 1948. E. J. MUCH 2,453,248
COMBINATION LAWN HOSE AND WATER NOZZLE SUPPORT
Filed Feb. 9, 1948
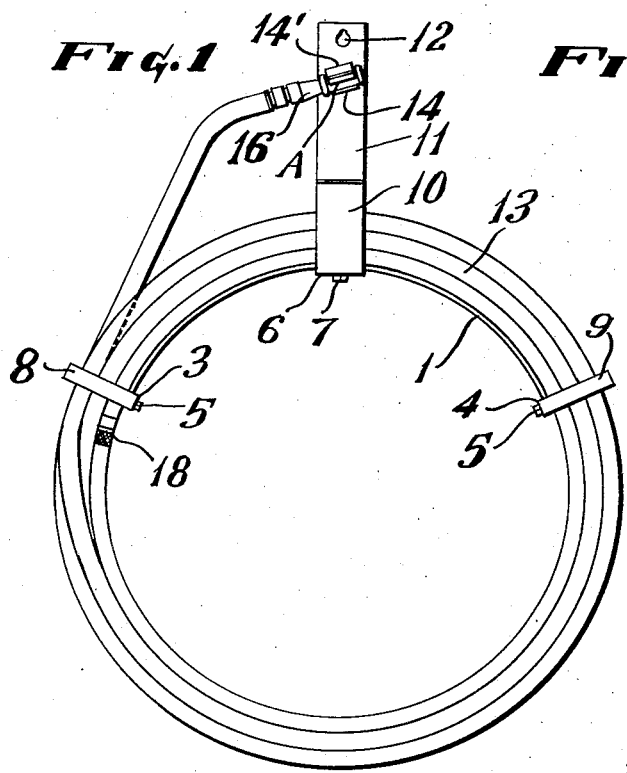
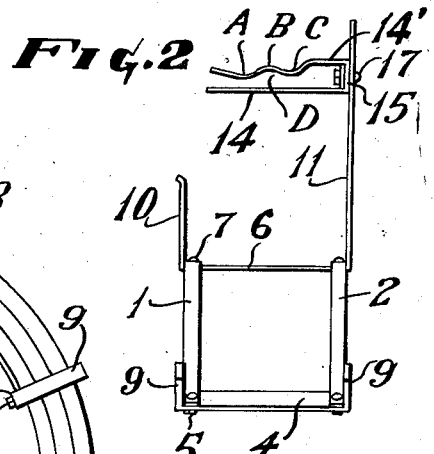
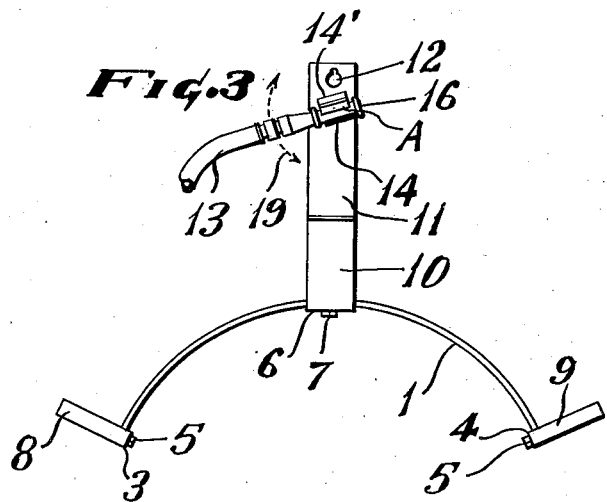
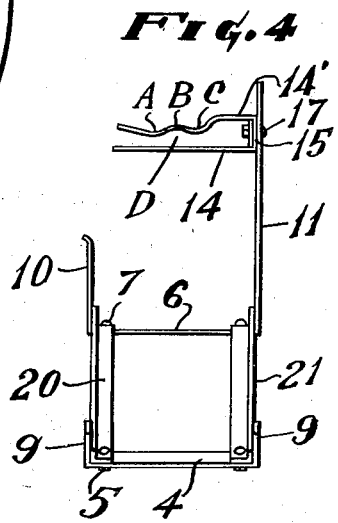
INVENTOR.
Edward J. Much Patented Nov. 9, 1948

2,453,248

UNITED STATES PATENT OFFICE 2,453,248

COMBINATION LAWN HOSE AND WATER NOZZLE SUPPORT

Edward J. Much, Wichita, Kans.

Application February 9, 1948, Serial No. 7,152

1 Claim. (Cl. 248—75)

This invention relates to a combination lawn hose and water nozzle support, and the principal object thereof is the provision of a support that is adaptable to two purposes, one purpose being to temporarily store a lawn hose by coiling the same over said support, and the other purpose being to support a water nozzle of said hose in a selected position for spraying water during irrigation.

An object of this invention is to provide a support that may be conveniently carried by a handle, regardless as to whether the support is used as a rack to temporarily store the hose as coiled, or whether the support is used to hold a hose nozzle in a selected direction for spraying.

A still further object of this invention is the provision of a support having means to anchor the same to a wall, or the like, when the support is employed as a rack to store the hose.

A still further object of this invention is to embody with the handle, a clamp for anchoring one end of the hose (preferably the water nozzle end) to avoid uncoiling of the hose when stored, and furthermore said clamp may be rocked on a horizontal axis whereby the support may be used as an adjustable water nozzle holder by uncoiling the hose from said support.

A still further object of this invention is to provide a support having a pair of arcuate ribs spaced apart and transverse bars to form a rack for a hose, whereby the support is light in weight and comparatively inexpensive to construct.

These and other objects will hereinafter be more fully explained, reference being had to the accompanying drawing forming a part of this specification, and in which like characters will apply to like parts in the different views.

Referring to the drawing:

Fig. 1 is a side elevation of the support with a water hose coiled thereabout.

Fig. 2 is an end view of the support, the hose being eliminated.

Fig. 3 is a side elevation of the support, illustrating the water nozzle end of the hose anchored.

Fig. 4 is an end view of a modified support, the hose being eliminated from said view.

The invention consists of a pair of arcuate ribs 1 and 2, said ribs being spaced apart and being in parallelism, and said ribs being made from elongated strips of flat metal and being bent to a desired arc. Corresponding ends of the ribs are provided with their respective transverse hose supporting bars 3 and 4, that are secured to said ribs by bolts 5, or the like. Intermediately of the ends of said ribs is another hose supporting transverse bar 6, said bar being fastened to said rib by bolts 7, and all of said bars being positioned at the underside of said ribs.

It will be seen that the end transverse bars 3 and 4 have their respective upwardly extending end portions 8 and 9 to retain a hose as coiled upon said bars. One end of the centrally disposed bar 6 is provided with an upturned portion 10, the other end of said bar 6 having an upturned portion 11 of greater length than that of the first said portion 10, the purpose of which is later described, said portions 10 and 11 to coact with the extensions of said bars 3 and 4 for retaining a series of coils of hose on said bars.

The bar extension portion 11 has adjacent its upper end an aperture 12 whereby the support may be anchored to a wall, or the like, when temporarily storing lawn hose 13.

Beneath the aperture 12 a short distance is a handle and water nozzle holder consisting of a U-shaped element that comprises a pair of legs 14 and 14', and a crotch 15, the legs being horizontally positioned so that the nozzle 16 of the hose may be inserted and retained by the legs of the U-shaped element. The U-shaped element is secured to the bar extension portion 11 through the medium of a bolt 17 that extends through the crotch and portion 11. The bolt 17 may be tightened to a degree wherein the U-shaped element may be turned on a horizontal axis by manual force, in which case, a water hose nozzle may be adjusted to a desired position when the hose is used for irrigation purpose. The U-shaped element which serves as a handle and a water hose holder may likewise retain the outer end of the hose from uncoiling when the hose is being stored, the inner end, as at 18, being retained by coils of hose placed there upon as shown in Fig. 1.

Fig. 1 illustrates the manner of supporting a hose coiled, while Fig. 3 illustrates principally the manner of retaining the nozzle of a hose by the U-shaped element when irrigating, the dotted lines 19 representing the rocking of the nozzle for adjusting the same to a desired slant.

It will be seen in Fig. 2 that the upper leg of the U-shaped element has a series of reversed curvatures A, B, and C to provide a concavity D in which the nozzle will engage to retain the same rigidly between the legs 14 and 14'.

Fig. 4 illustrates a modification, wherein the ribs 20 and 21 are angle-shaped in cross section, the function of which is similar to that illustrated in Fig. 2, and as the remaining components in said Fig. 4 are identical as that above described for the other figures they are given similar reference characters.

In practice I have found the form of my invention as illustrated in the accompanying drawing and referred to in the above description, the preferred embodiment with respect to simplicity and efficiency; yet realizing that conditions concurrent with the adoption of my invention will necessarily vary, I desire to emphasize that various minor changes in details of construction, proportion and arrangement of parts, may be resorted to without departing from the spirit of this invention and as lie within the scope of the appended claim.

Having fully described my invention what I claim as new and desire to secure by Letters Patent is:

In a combination lawn hose and water nozzle support, a pair of arcuate ribs spaced apart, transverse bars secured to the ribs for supporting a lawn hose, extensions extending upwardly from the ends of said bars to retain said hose upon said bars, a centrally disposed bar of the transverse bars having one of its extensions greater in length, and a U-shaped element adjustably carried by last said extension, said U-shaped element having legs adapted to spring apart for insertion of a water hose nozzle therebetween.

EDWARD J. MUCH.

REFERENCES CITED

The following references are of record in the file of this patent:

UNITED STATES PATENTS

| Number | Name | Date |
|---|---|---|
| 741,922 | Muldoon | Oct. 20, 1903 |
| 2,254,431 | Levine | Sept. 2, 1941 |